United States Patent
Sabato

(10) Patent No.: US 11,373,542 B2
(45) Date of Patent: Jun. 28, 2022

(54) PROXIMITY NAVIGATION OF UNMANNED VEHICLES

(71) Applicant: ISRAEL AEROSPACE INDUSTRIES LTD., Lod (IL)

(72) Inventor: Moshe Sabato, Yishuv Hashmonayim (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 16/961,546

(22) PCT Filed: Jan. 10, 2019

(86) PCT No.: PCT/IL2019/050046
§ 371 (c)(1),
(2) Date: Jul. 10, 2020

(87) PCT Pub. No.: WO2019/145936
PCT Pub. Date: Aug. 1, 2019

(65) Prior Publication Data
US 2021/0012667 A1    Jan. 14, 2021

(30) Foreign Application Priority Data

Jan. 29, 2018   (IL) ......................................... 257212
Jul. 26, 2018   (IL) ......................................... 260806

(51) Int. Cl.
*G08G 5/00*     (2006.01)
*G05D 1/10*     (2006.01)
(Continued)

(52) U.S. Cl.
CPC ........... *G08G 5/006* (2013.01); *B64C 39/024* (2013.01); *G05D 1/104* (2013.01); *G05D 1/1064* (2019.05);
(Continued)

(58) Field of Classification Search
CPC ..................................................... G08G 5/006
See application file for complete search history.

(56) References Cited

U.S. PATENT DOCUMENTS 5,521,817 A   5/1996   Burdoin et al.
5,728,965 A   3/1998   Fesland et al.
(Continued)

FOREIGN PATENT DOCUMENTS

EP   0737841 A1   10/1996
GB   2476149 A    6/2011
(Continued)

OTHER PUBLICATIONS

Kornatowski, P.M., et al., An Origami Inspired Cargo Drone, 2017 IEEE/RSJ International Conference on Intelligent Robots and Systems (IROS) Sep. 24-28, 2017, Vancouver, BC, Canada (https://ieeexplore.IEEE.org/stamp/stamp.jsp?tp=&arnumber=8206607) (2017)(hereinafter "Kornatowski").*
(Continued)

*Primary Examiner* — Jean Paul Cass
(74) *Attorney, Agent, or Firm* — Dorsey & Whitney LLP

(57) ABSTRACT

The presently disclosed subject matter includes an active proximity system (APS) mountable on an unmanned autonomous vehicle (UxV), the APS comprising: one or more proximity sensors and a processing circuitry; the one or more proximity sensors are configured to sense one or more proximity signals, each of the signals is indicative of the presence of a respective emitter in proximity to the UxV; the processing circuitry is configured, responsive to a sensed proximity signal, to repeatedly: generate maneuvering instructions dedicated for causing the UxV to move and increase the distance between the UxV and the respective emitter; and then generate maneuvering instructions dedicated for causing the UxV to move and decrease the distance between the UxV and the respective emitter; and thereby (Continued)

maintain the UxV within a certain range from the respective emitter defined by the sensed proximity signal.

19 Claims, 9 Drawing Sheets

(51) Int. Cl.
*B64C 39/02* (2006.01)
*G08G 5/04* (2006.01)

(52) U.S. Cl.
CPC .......... *G08G 5/0069* (2013.01); *G08G 5/045* (2013.01); *B64C 2201/143* (2013.01)

(56) References Cited

U.S. PATENT DOCUMENTS

| | | | |
|---|---|---|---|
| 6,926,233 B1 | 8/2005 | Corcoran | |
| 7,478,817 B1* | 1/2009 | Carrier | F41H 7/02 |
| | | | 440/12.5 |
| 9,104,201 B1 | 8/2015 | Pillai et al. | |
| 9,302,782 B2 | 4/2016 | Frolov et al. | |
| 9,311,820 B2* | 4/2016 | Batla | G08G 5/0039 |
| 9,354,296 B2* | 5/2016 | Ubhi | B64C 39/024 |
| 9,415,869 B1 | 8/2016 | Chan et al. | |
| 9,508,264 B2 | 11/2016 | Chan et al. | |
| 9,542,850 B2* | 1/2017 | Kantor | G08G 5/0091 |
| 9,646,283 B2* | 5/2017 | Kantor | B64D 1/02 |
| 9,671,790 B2* | 6/2017 | Srivastava | G08G 5/0026 |
| 9,881,021 B2* | 1/2018 | Pasko | G08G 5/0034 |
| 9,881,022 B2* | 1/2018 | Ubhi | G08G 5/0086 |
| 2009/0099768 A1* | 4/2009 | Bauer | G08G 1/0962 |
| | | | 701/467 |
| 2012/0185129 A1* | 7/2012 | Carrier | B62D 53/005 |
| | | | 180/24.07 |
| 2015/0234385 A1 | 8/2015 | Sandin et al. | |
| 2016/0293018 A1 | 10/2016 | Kim et al. | |
| 2017/0090483 A1 | 3/2017 | Smith et al. | |
| 2017/0283054 A1 | 10/2017 | Wang | |
| 2017/0358864 A1* | 12/2017 | Arias | H01Q 1/28 |
| 2018/0217593 A1* | 8/2018 | Erickson | G05D 1/104 |
| 2018/0231972 A1* | 8/2018 | Woon | G05D 1/0808 |
| 2019/0051198 A1* | 2/2019 | Nimmagadda | G05D 1/0088 |

FOREIGN PATENT DOCUMENTS

| | | |
|---|---|---|
| JP | 2017515092 A | 6/2017 |
| JP | 2017174442 A | 9/2017 |
| JP | 2018510425 A | 4/2018 |
| KR | 101767492 B1 | 8/2017 |
| WO | 2014018147 A2 | 1/2014 |
| WO | 2016154945 A1 | 10/2016 |
| WO | 2016209504 A1 | 12/2016 |
| WO | 2017043694 A1 | 3/2017 |
| WO | 2017044079 A1 | 3/2017 |
| WO | 2017199481 A1 | 11/2017 |

OTHER PUBLICATIONS

Lui, Yecheng et al., A virtual-waypoint based artificial potential field method for UAV path planning, 2016 IEEE Chinese Guidance, Navigation and Control Conference (CGNCC)( https://ieeexplore. ieee.org/abstract/document/7828913) (hereinafter "Yecheng").*
International Preliminary Report on Patentability for International Application No. PCT/IL2019/050046 completed Feb. 5, 2020.
International Search Report and Written Opinion from International Application No. PCT/IL2019/050046 dated Mar. 11, 2019.

* cited by examiner

PROXIMITY NAVIGATION OF UNMANNED VEHICLES

TECHNICAL FIELD

The presently disclosed subject matter generally relates to navigation of unmanned and autonomous vehicles (UxVs).

BACKGROUND

Unmanned and autonomous air/surface/ground/marine (x) vehicles (denoted herein in short as "UxVs") are becoming today increasingly popular in civilian applications. UxVs may be used in a large variety of applications including, for example, traffic monitoring, remote sensing and reconnaissance, transportation of goods, search and rescue, domestic policing, and the like.

UxVs include various types, such as, for example, Unmanned Aerial Vehicles (UAVs) also known as Unmanned Aerial systems or drones, Unmanned Ground Vehicles (UGVs), Unmanned Marine Vehicles (UMVs), etc.

A UxV can include an onboard image acquisition payload such as a camera (e.g. black/white, color and Infra-Red, or the like) which can be used for capturing video and/or stills images e.g. over a specific geographical location.

GENERAL DESCRIPTION

It some cases it is desired to enable the operation of multiple UxVs in close proximity to each other. As a specific example, it is sometimes desired to enable flying multiple unmanned aerial vehicles (UAVs) in close proximity in order to increase the number of UAVs that can fly in a certain restricted area, while at the same time avoiding damaging and/or disrupting the UAVs as a result of collision.

Consider for example, a plurality of UAVs deployed over an area where a public event is taking place (e.g. a demonstration, a music concert, a sports event, or the like) for the purpose of capturing images (e.g. video stream) of the ongoing event. All UAVs are confined above an area that provides a vantage point, allowing viewing and capturing the event area (e.g. above a sports stadium). It may be desired to crowd the UAVs together in order to increase the number of UAVs that can fly over the area and record the event simultaneously without causing any interruption to each other.

As another example, consider an aviation flight corridor (also known as "airway") which is utilized by multiple UAVs to travel from one destination point to another. Again, in order to increase the number of UAVs that can make use of the corridor per unit of time, it may be desired to crowd the UAVs together while traveling through the corridor.

According to some examples of the presently disclosed subject matter, each one of a plurality of UxVs operating within a certain restricted area (referred to herein also as an "area of interest") is maneuvered to maintain close proximity to other UxVs to enable crowding of the UxVs in the area of interest. To this end, each UxV can comprise an on-board active proximity system (APS) configured to execute navigation maneuvers dedicated to crowd the UxVs in a densely packed formation and thereby increase the number of UxVs which can simultaneously operate in the same area of interest without causing damage or disrupting operation of the UxVs.

In the case of UAVs, each one of a plurality of UAVs flying in a certain area of interest (e.g. an area above a sports stadium) is maneuvered to fly in close proximity to other UAVs to enable a dense flying formation. According to some examples disclosed herein, a given UAV is configured to maintain a certain predefined distance from other entities (referred to herein as "emitter"; e.g. another UAV) based on reception of a signal (referred to herein as "proximity signal") transmitted by the entity. As explained in more detail below, the proximity signal defines a boundary of an area to which access of the UAV is prohibited. An airborne UAV executes flying maneuvers that include flying toward to and/or away from the emitter in order to preserve the predefined distance between the UAV and the emitter and avoid entry into the prohibited area.

According to an aspect of the presently disclosed subject matter, there is provided an active proximity system (APS) mountable on an unmanned autonomous vehicle (UxV), configured to cause the UxV to maintain a range from one or more emitters operating in the same area, the APS comprising:

one or more proximity sensors and a processing circuitry operably coupled to the one or more proximity sensors; the one or more proximity sensors are configured to sense one or more proximity signals, each of the one or more proximity signals is indicative of the presence of a respective emitter in proximity to the UxV; the processing circuitry is configured, responsive to a sensed proximity signal, to repeatedly:

generate maneuvering instructions dedicated for causing the UxV to move and increase the distance between the UxV and the respective emitter; and then generate maneuvering instructions dedicated for causing the UxV to move and decrease the distance between the UxV and the respective emitter;

and thereby maintain the UxV within a certain range from the respective emitter defined by the sensed proximity signal.

In addition to the above features, the method according to this aspect of the presently disclosed subject matter can optionally comprise one or more of features (i) to (xix) below, in any technically possible combination or permutation.

i. wherein the sensed proximity signal is transmitted by the emitter and wherein the processing circuitry is configured to repeatedly:

generate the maneuvering instructions dedicated for causing the UxV to move and increase the distance between the UxV and the respective emitter until reception of the proximity signal is lost, and then generate the maneuvering instructions dedicated for causing the UxV to move and decrease the distance between the UxV and the respective emitter until reception of the sensed proximity signal is regained.

ii. wherein the sensed proximity signal is transmitted by the emitter and wherein the processing circuitry is configured to repeatedly:

generate the maneuvering instructions dedicated for causing the UxV to move and increase the distance between the UxV and the respective emitter until a value of a measurable parameter of the proximity signal is indicative of a distance between the UxV and the emitter, which is equal to or greater than a predefined threshold, and then generate the maneuvering instructions dedicated for causing the UxV to move and decrease the distance between the UxV and the respective emitter until a value of a measurable parameter of the proximity signal is indicative of a distance between the UxV and the emitter, which is equal to or smaller than the predefined threshold.

iii. wherein the sensed proximity signal is transmitted by the emitter and wherein the processing circuitry is configured to repeatedly:
l. generate the maneuvering instructions dedicated for causing the UxV to move and increase the distance between the UxV and the respective emitter until reception of the proximity signal is lost, and then, generate the maneuvering instructions dedicated for causing the UxV to move and decrease the distance between the UxV and the respective emitter until a value of a measurable parameter of the proximity signal is indicative of a distance between the UxV and the emitter, which is equal to or smaller than the predefined threshold.
iv. wherein the sensed proximity signal is transmitted by the emitter and wherein the processing circuitry is configured to repeatedly:
generate the maneuvering instructions dedicated for causing the UxV to move and increase the distance between the UxV and the respective emitter until a value of a measurable parameter of the proximity signal is indicative of a distance between the UxV and the emitter, which is equal to or greater than a predefined threshold, and then generate the maneuvering instructions dedicated for causing the UxV to move and decrease the distance between the UxV and the respective emitter until reception of the sensed proximity signal is regained.
v. wherein the sensed proximity signal is transmitted by the emitter and wherein the one or more proximity sensors include a receiver configured to receive a data-carrying proximity signal comprising data identifying the emitter and/or navigation data.
vi. wherein the receiver is an RF receiver configured to receive an RF proximity signal.
vii. wherein the receiver includes a Wifi and/or Bluetooth receiver, configured to receive a Wifi proximity signal and/or Bluetooth proximity signal, respectively.
viii. wherein the processing circuitry is configured to obtain the data from the sensed proximity signal and determine, based on the data, a current and/or future position of the emitter.
ix. wherein the maneuvering instructions are configured to be executed by a driving unit on-board the UxV, configured for moving the UxV relative to the respective emitter.
x. wherein the processing unit is configured to provide the maneuvering instructions to a navigation computer on-board the UxV, configured to control the driving unit.
xi. wherein the one or more emitters include other UxVs and/or static structures or devices.
xii. The system further comprises the emitters; wherein at least one of the emitters is positioned on a static structure and is arranged to transmit a proximity signal in an area surrounding the structure, the proximity signal is indicative of an area restricted from entry of the UxV.
xiii. wherein the emitters are positioned each on a respective static structure positioned along a course, the proximity signals generated by the emitters creating a continuous and confined corridor where the UxV is allowed to travel.
xiv. wherein the other UxVs include at least one UAV.
xv. wherein the UxV is a UAV.
xvi. The system is configured to generate a proximity signal and further comprises a transmitter configured to transmit a proximity signal.
xvii. The system is configured to transmit an initiation signal for causing the emitter to transmit the proximity signal.
xviii. The system further comprises a mechanical cage configured to protect the UxV from mechanical damage; the mechanical cage comprises and/or is otherwise operatively connected to the one or more proximity sensors capable of sensing contact therewith, and wherein the processing circuitry is configured, responsive to contact sensed by the cage, to repeatedly: generate the maneuvering instructions dedicated for causing the UxV to move and increase the distance between the UxV and the respective emitter until there is no physical contact between the UxV and the emitter, and then generate the maneuvering instructions dedicated for causing the UxV to move and decrease the distance between the UxV and the respective emitter until there is physical contact between the UxV and the emitter.
xix. The system wherein the one or more proximity sensors include an omni directional antenna.

According to another aspect of the presently disclosed subject matter there is provided a method of deploying a UxV in an area populated with a plurality of emitters, the method comprising executing at the UxV the following operation:

sensing. by one or more proximity sensors, one or more proximity signals, each of the one or more proximity signals is indicative of the presence of a respective emitter in proximity to the UxV;
with the help of a processing circuitry, responsive to a sensed proximity signal, repeatedly:
generating maneuvering instructions dedicated for causing the UxV to move and increase the distance between the UxV and the respective emitter; and then
generating maneuvering instructions dedicated for causing the UxV to move and decrease the distance between the UxV and the respective emitter;
and thereby maintaining the UxV within a certain range from the respective emitter defined by the sensed proximity signal.

According to another aspect of the presently disclosed subject matter there is provided a method of crowding a plurality of UxVs in a restricted area, the method comprising:

at each UxV operating a computerized system for:
transmitting a uniquely identifiable self-proximity signal;
sensing. by one or more proximity sensors, one or more proximity signals, each of the one or more proximity signals is indicative of the presence of a respective UxV emitting the proximity signal;
responsive to a sensed proximity signal from a respective UxV, repeatedly:
generating maneuvering instructions dedicated for causing the UxV to move and increase the distance between the UxV and the respective UxV; and then
generating maneuvering instructions dedicated for causing the UxV to move and decrease the distance between the UxV and the respective UxV;
and thereby maintaining the UxV within a certain range from the respective UxV, the range being defined by the sensed proximity signal.

According to another aspect of the presently disclosed submitted matter there is provided a UxV configured to be deployed in an area populated with a plurality of emitters, the UxV comprising:

a driving unit configured to drive the UxV; an active proximity system (APS), configured to cause the UxV to maintain a range from one or more emitters, the APS comprising:
one or more proximity sensors and a processing circuitry operably coupled to the one or more proximity sensors;

the one or more proximity sensors are configured to sense one or more proximity signals, each of the one or more proximity signals is indicative of the presence of a respective emitter in proximity to the UxV; the processing circuitry is configured, responsive to a sensed proximity signal, to repeatedly:

generate maneuvering instructions dedicated for causing the driving unit to move the UxV and increase the distance between the UxV and the respective emitter; and then generate maneuvering instructions dedicated for causing the driving unit to move the UxV and decrease the distance between the UxV and the respective emitter;

to thereby maintain the UxV within a certain range from the respective emitter defined by the sensed proximity signal.

According to yet another aspect of the presently disclosed subject matter there is provided a non-transitory computer readable storage medium tangibly embodying a program of instructions that, when executed by a computer mounted on a UxV, cause the computer to perform a method of deploying a UxV in an area populated with a plurality of emitters, the method comprising:

receiving one or more proximity signals, each of the one or more proximity signals is indicative of the presence of a respective emitter in proximity to the UxV;

responsive to a sensed proximity signal, repeatedly:

generating maneuvering instructions dedicated for causing the UxV to move and increase the distance between the UxV and the respective emitter; and then generating maneuvering instructions dedicated for causing the UxV to move and decrease the distance between the UxV and the respective emitter;

and thereby maintaining the UxV within a certain range from the respective emitter defined by the sensed proximity signal.

According to another aspect of the presently disclosed subject matter, there is provided an active proximity system (APS) mountable on an unmanned autonomous vehicle (UxV), configured to cause the UxV to maintain a range from one or more emitters operating in the same area, the APS comprising:

a mechanical cage configured to protect the UxV from mechanical damage, the mechanical cage comprises and/or is otherwise operatively connected to the one or more proximity sensors capable of sensing contact, and a processing circuitry operably coupled to the one or more proximity sensors;

the processing circuitry is configured, responsive to contact sensed by the cage, to repeatedly: generate maneuvering instructions dedicated for causing the UxV to move and increase the distance between the UxV and the respective emitter until there is no physical contact between the UxV and the emitter, and then generate maneuvering instructions dedicated for causing the UxV to move and decrease the distance between the UxV and the respective emitter until there is physical contact between the UxV and the emitter, and thereby maintain the UxV within a certain range from the respective emitter defined by the sensed proximity signal.

The methods, UxV, non-transitory computer readable storage medium and APS, disclosed herein according to various aspects, can optionally further comprise one or more of features (i) to (xix) listed above, mutatis mutandis, in any technically possible and applicable combination or permutation.

There is also provided a method of restricting movement of a UxV, the method comprising:

placing at least one emitter on a structure;

using the emitter for transmitting a proximity signal in an area surrounding the structure; the proximity signal, when received by the UxV, is indicative of an area restricted from entry of the UxV.

Where in some examples, the method further comprises:

placing a plurality of emitters at a plurality of respective locations along a course;

transmitting from each emitter a proximity signal indicating an area restricted from entry of the UxV;

wherein the emitters are distributed along the course in a manner that creates a continuous coverage of proximity signals along the course to thereby provide a restricted corridor where the UxV (e.g. UAV) is allowed to travel.

The method further comprising:

deploying a plurality of UxVs within the corridor and executing at each one of the plurality of UxVs the following operations:

sensing, by one or more proximity sensors, one or more proximity signals, each of the one or more proximity signals is indicative of the presence of a respective emitter in proximity to the UxV;

with the help of a processing circuitry, responsive to a sensed proximity signal, to repeatedly:

generate maneuvering instructions dedicated for causing the UxV to move and increase the distance between the UxV and the respective emitter; and then generate maneuvering instructions dedicated for causing the UxV to move and decrease the distance between the UxV and the respective emitter; and thereby maintain the UxV within the corridor defined by the proximity signals.

Where in some examples the UxV is a UAV and the corridor is a flight corridor.

According to another aspect of the presently disclosed subject matter there is provided a system for generating a virtual corridor for restricting movement of UxVs within the corridor, the system comprising:

a plurality of emitters positioned at a plurality of respective locations along a course; wherein each emitter is configured to transmit a proximity signal indicating an area restricted for entry of the UxVs;

wherein the emitters are distributed along the course in a manner that creates a continuous coverage of proximity signals along the course to thereby provide the virtual corridor where the UxVs (e.g. UAVs) are allowed to travel.

In some examples the system further comprises a plurality of UxVs (e.g. UAVs), each of the plurality of UxVs comprising:

a driving unit configured to drive the UxV; an active proximity system (APS), configured to cause the UxV to maintain a range from one or more emitters, the APS comprising:

one or more proximity sensors and a processing circuitry operably coupled to the one or more proximity sensors;

the one or more proximity sensors are configured to sense one or more proximity signals, each of the one or more proximity signals is indicative of the presence of a respective emitter in proximity to the UxV; the processing circuitry is configured, responsive to a sensed proximity signal, to repeatedly:

generate maneuvering instructions dedicated for causing the driving unit to move the UxV and increase the distance between the UxV and the respective emitter, and then generate maneuvering instructions dedicated for causing the driving unit to move the UxV and decrease the distance between the UxV and the respective emitter;

to thereby maintain the UxV within a certain range from the respective emitter defined by the sensed proximity signal and retain within the corridor.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 2b is a schematic illustration showing in top view the scenario illustrated in FIG. 2a;

DETAILED DESCRIPTION

Figure 1:
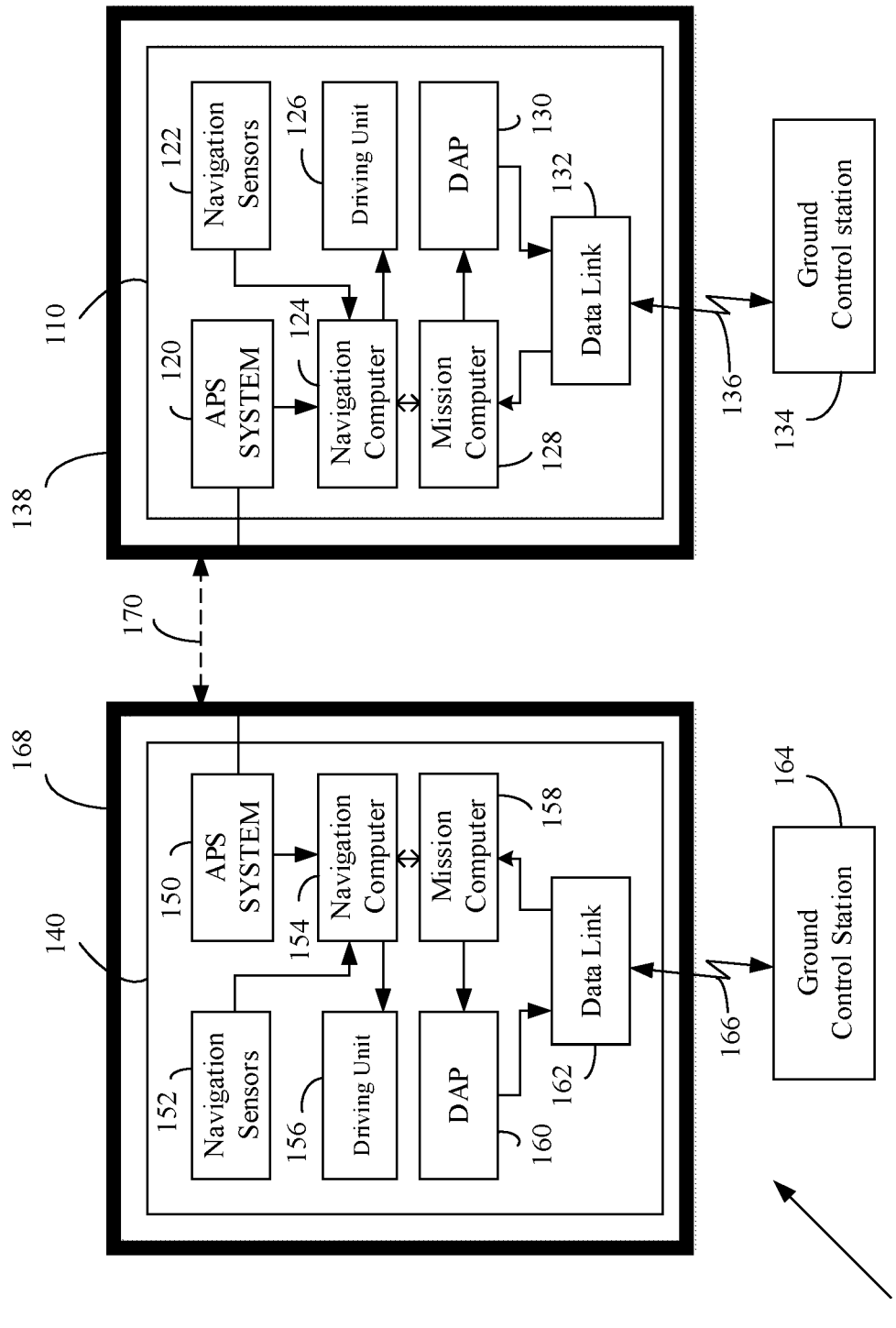
FIG. 1 is a schematic illustration of a block diagram of two UxVs 110 and 120, in accordance with some examples of the presently disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Discussions herein utilizing terms such as, for example, "sensing", "generating", "maintaining", "obtaining", "processing", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example. "a plurality of items" includes two or more items.

As used herein, the phrase "for example," "such as", "for instance" and variants thereof describe non-limiting embodiments of the presently disclosed subject matter. Reference in the specification to "one case". "some cases", "other cases" or variants thereof means that a particular feature, structure or characteristic described in connection with the embodiment(s) is included in at least one embodiment of the presently disclosed subject matter. Thus the appearance of the phrase "one case", "some cases". "other cases" or variants thereof does not necessarily refer to the same embodiment(s).

As used herein, unless otherwise specified, the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The term "computer" and/or "computing system" as used herein, includes, for example, any kind of hardware-based electronic device comprising a processing circuitry (including for example: Central Processing Unit (CPU), a microprocessor, an electronic circuit, an Integrated Circuit (IC), firmware written for or ported to a specific processor such as digital signal processor (DSP), a microcontroller, a field programmable gate array (FPGA), an application specific integrated circuit (ASIC), etc.) configured for executing computer instructions readable for example, from a computer memory, which can also be part of the processing circuitry or operatively connected thereto.

In the drawings and descriptions set forth, identical reference numerals indicate those components that are common to different embodiments or configurations. Elements in the drawings are not necessarily drawn to scale.

It is appreciated that certain features of the claimed subject matter, which are, for clarity, described in the context of separate embodiments, may also be provided in combination in a single embodiment. Conversely, various features of the invention, which are, for brevity, described in the context of a single embodiment, may also be provided separately or in any suitable sub-combination. While the invention has been shown and described with respect to particular embodiments, it is not thus limited. Numerous modifications, changes and improvements within the scope of the claimed subject matter will now occur to the reader.

Figure 4:
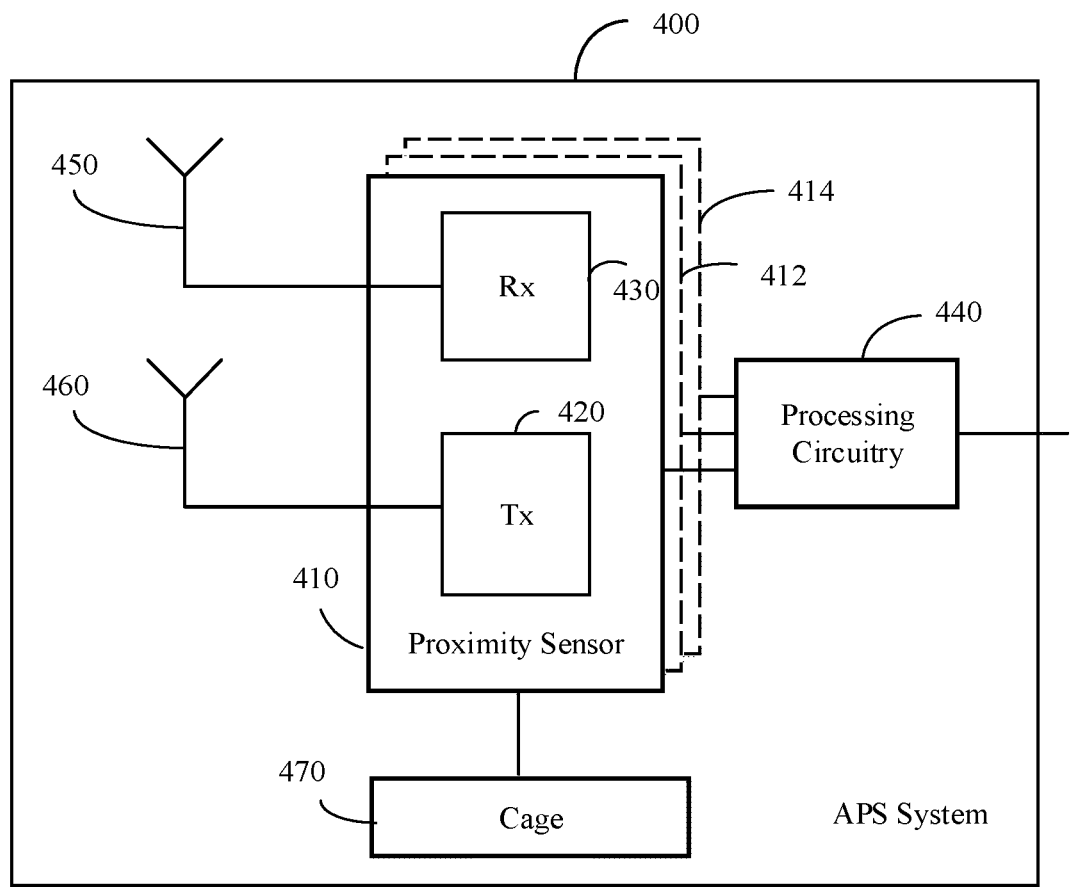
FIG. 4 is a schematic illustration of an active proximity system, in accordance with some examples of the presently disclosed subject matter.
Figure 5A:
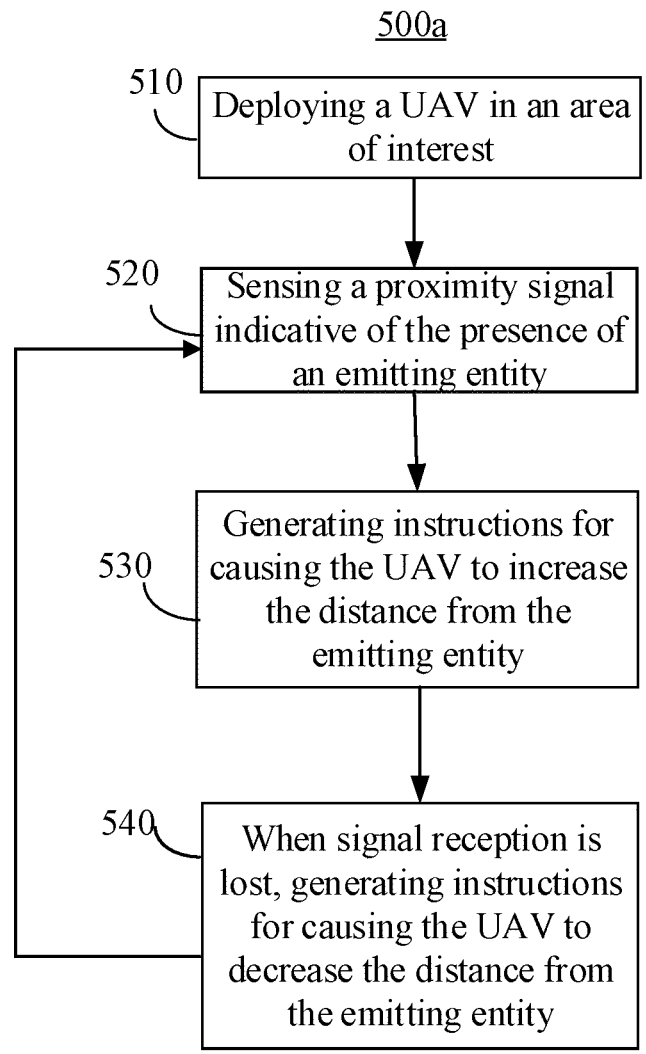
FIG. 5a is a flow chart showing operations of a method carried out in accordance with some with some examples of the presently disclosed subject matter.
Figure 5B:
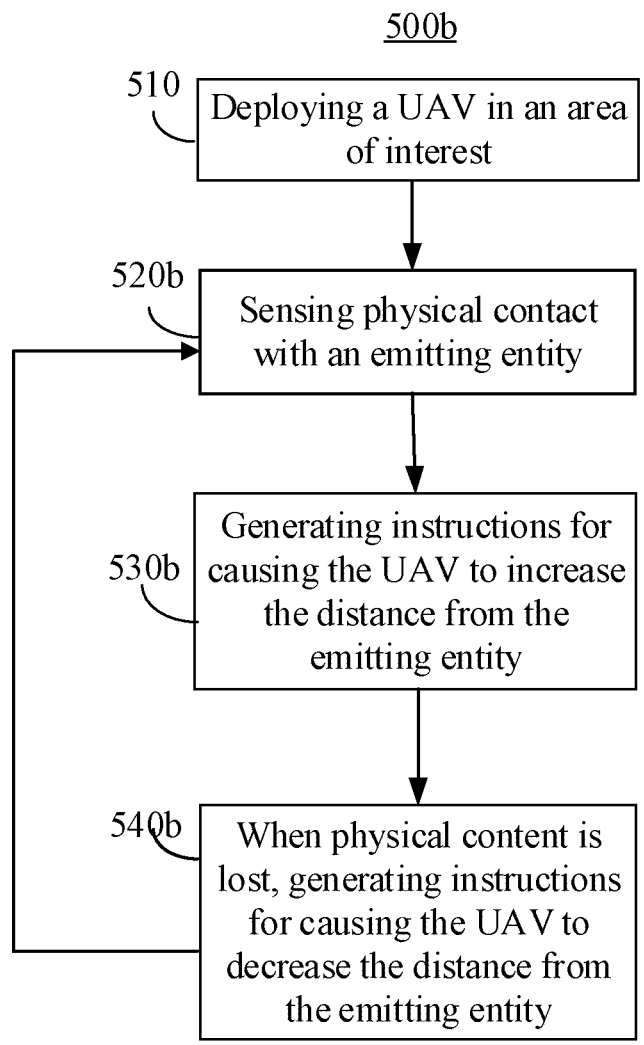
FIG. 5b is another flow chart showing operations of a method carried out in accordance with some with some examples of the presently disclosed subject matter.
Figure 5C:
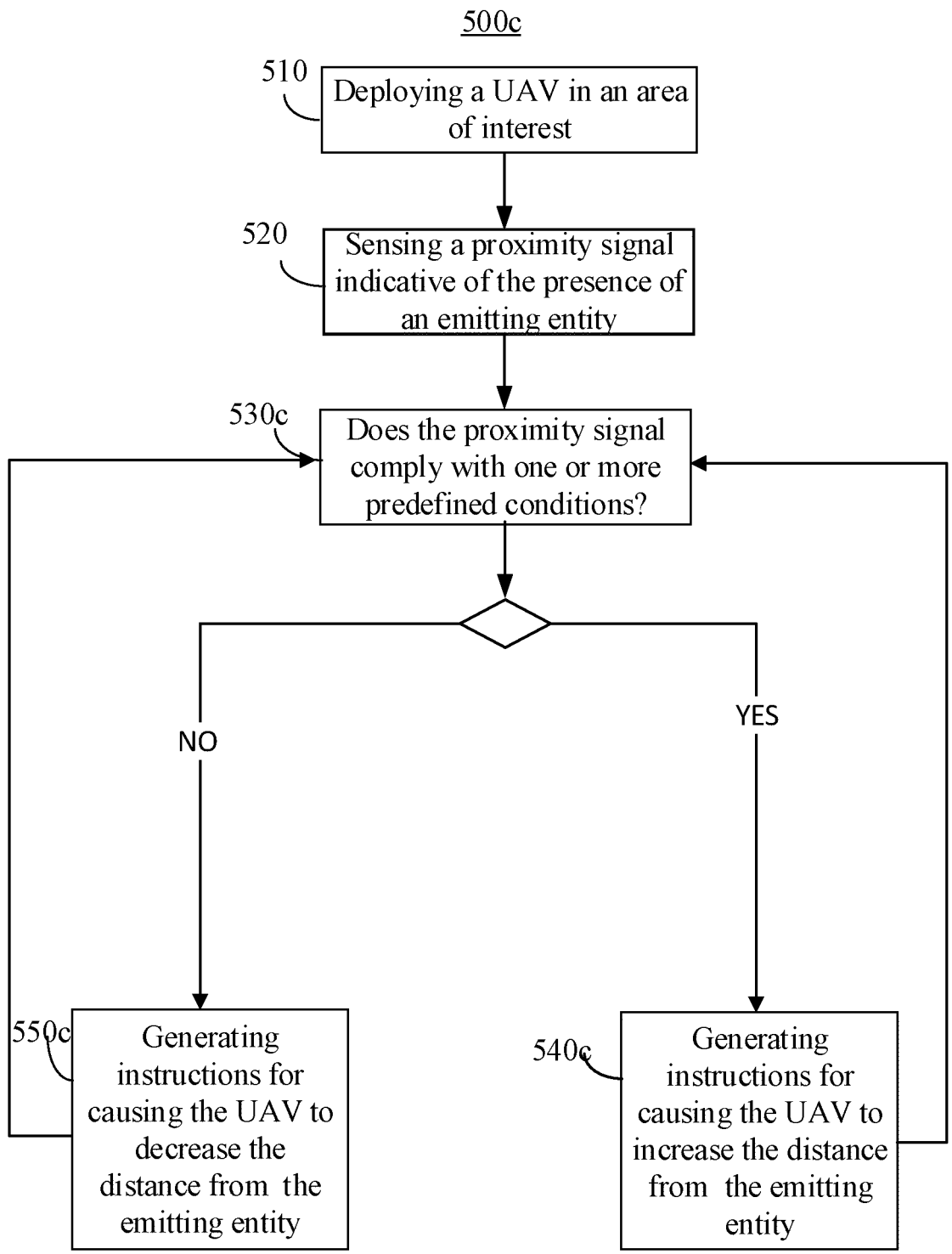
FIG. 5c is yet another flow chart showing operations of a method carried out in accordance with some with some examples of the presently disclosed subject matter.

In embodiments disclosed herein, fewer, more and/or different stages than those shown in FIGS. 5a-5c may be executed. In embodiments of the disclosed subject matter, one or more stages illustrated in FIGS. 5a-5c may be executed in a different order and/or one or more groups of stages may be executed simultaneously. FIG. 1 and FIG. 4 illustrate a schematic of the system architecture in accordance with embodiments of the presently disclosed subject matter. The blocks illustrated in FIGS. 1 and 4 may be centralized in one location or dispersed over more than one location. In other embodiments, the system may comprise fewer, more and/or different blocks than those shown in FIGS. 1 and 4.

Attention is drawn to FIG. 1, which presents a schematic illustration of a block diagram of UxVs 110 and UxV 140, in accordance with some examples of the presently disclosed subject matter. In the following description UxVs 110 and UxV 140 are described by way of example as unmanned aerial vehicles i.e. UAV 110 and UAV 140. However, as mentioned above, the presently disclosed subject matter contemplates other types of unmanned vehicles. It is thus noted that the principles described herein with respect to UAVs can be likewise implemented with other types of vehicles, mutatis nutandis, and accordingly the specific example of UAVs should not be construed as limiting.

According to some examples, a UAV (110, 140) is controlled by a ground control station (134 and 164, respectively), via a wireless communication link (136 and 166, respectively). Ground control station (134, 164) can include a communication unit, e.g., a radio (not shown) comprising an antenna and configured for communicating data and/or control transmissions to and/or from the UAV (110, 140).

UAV (110, 140) can include a data link unit (132 and 164, respectively). Data link unit (132, 164) can include, for example, a communication unit (not shown) operably coupled to one or more antennas. The communication unit, e.g., a radio, can include a transmitter and a receiver configured to receive, for example, data and commands from the respective ground control station (134, 164), and transmit data to the respective ground control station (134, 164) via wireless communication link (136 and 166, respectively). Data received at the control station can be displayed and viewed by an operator and/or user. Data transmitted by the UAV includes for example, location data, data obtained by a data acquisition payload (e.g. video streams and still images), system health data, etc.

UAV (110, 140) can further include a mission computer (128 and 158, respectively) operably coupled to a navigation computer (124 and 154, respectively). Mission computer can receive for example, mission data from the ground control station (134, 166), process the received mission data, and execute mission operations required for completing a mission. In some examples, mission computer (128, 158) can provide data to a navigation computer (124, 154, respectively), the data being indicative for example, of a desired change in the UAV position or a desired target destination. The navigation computer can be configured in turn, to generate navigation commands (also referred to herein as "maneuvering commands") for repositioning the UAV and/or directing the UAV to a desired target destination. The generated navigation commands can be fed to a driving unit (126, 156) configured to control the vehicle to fly in the desired direction. In case of a UAV, the driving unit (126, 156) comprises flight control devices including for example, actuators, rotors, and throttle configured for moving the unmanned vehicle according to the navigation commands.

The UAV (110, 140) can further comprise one or more navigation sensors (122, 152, respectively) including for example one or more of: gyrocompass; GPS receiver; inertial navigation system (INS); etc. During navigation of the UAV, the navigation computer (124, 154) utilizes the navigation sensors (122, 152) for determining navigation data such as UAV position (e.g. geolocation) and attitude and controlling the UAV flight accordingly.

According to some examples, the UAV can comprise on-board data acquisition payloads (130, 160, respectively; abbreviated "DAP") configured to obtain information with respect to a surveyed scene. The obtained data can be transmitted over the communication link to a respective control station, where it can be displayed and viewed by an operator and/or user. On-board data acquisition payloads can comprise for example, one or more of: camera (e.g. color vision camera, black and white camera, infrared camera, thermographic camera, etc.); RADAR; LIDAR; etc.

According to some examples of the presently disclosed subject matter, the UAV (110, 140) comprises an active proximity system (120, 150; abbreviated APS) which is a computerized system configured to sense proximity to an emitter. Proximity to an emitter is determined, according to some examples, by sensing a signal (170, referred to herein as "proximity signal"), transmitted by the emitter. Notably, transmission of a proximity signal can be initiated by the emitter, or in some examples it can be initiated in response to a query signal transmitted by the UAV. According to the latter example, the UAV transmits (e.g. omni-directionally) a query signal, which initiates the transmission of the proximity signal by the emitter in response to the initiation signal.

An emitter can be for example another UAV or some other vehicle. An emitter can also be some other signal transmitter or a device comprising a signal transmitter configured and operable to generate and transmit a proximity signal as disclosed herein. For example, a signal transmitted placed on a static structure (e.g. building, bridge, wall or the like) or in some open area, can be used for restricting UAVs from approaching the structure or area (and/or colliding with the structure or entering the area).

The proximity signal can include data identifying the respective emitter (e.g. a unique name or id number). The received signal can further include navigation data of the emitter, such as position, attitude and/or velocity (speed and direction) of the emitting UAV or static location in case of a static emitter. As explained further below, this information can be used by other UAVs for operating in a crowded formation within an area of interest.

In some examples, the received proximity signal is a radio frequency (RF) signal which is indicative of the presence of a nearby emitter. The RF signal can be generated, for example, in accordance with IEEE 802.11 standards family, e.g. WiFi, Bluetooth, 60 Giga Hertz (GHz), or the like. Alternatively, the RF signal can be generated according to any other wireless communications standard. According to the subject matter disclosed herein, such RF signal protocols are utilized for transmitting information including the identification and navigation data, as mentioned above.

In some examples, the RF signal can be modulated according to a signal modulation scheme such as: amplitude modulation (AM) scheme, frequency modulation (FM) scheme, quadrature amplitude modulation (QAM) scheme, orthogonal frequency-division multiplexing (OFDM) modulation scheme, and/or any other modulation scheme.

The received proximity signal can be used by an APS (120, 150) on-board a UAV, to maintain the distance between the UAV and an emitter transmitting the signal (e.g. another UAV). In some examples, APS (120, 150) is configured to operate as a virtual protective cage (138, 168) surrounding the UAV (110, 140). To this end APS (120, 150) can include a plurality of proximity sensors (not shown) configured to sense proximity signals from a plurality of directions surrounding the UAV. Alternatively or additionally, APS can comprise or be otherwise operably coupled to one or more antennas (e.g. omnidirectional antennas) capable of receiving signals (RF proximity signals: e.g. WiFi and/or Bluetooth signals) from a plurality of directions around the UAV. According to some examples, APS is capable of sensing a proximity signal received from all directions surrounding the UAV, thus providing a virtual spherical cage surrounding the UAV. The distance that should be maintained from a given emitter can be defined for example by the signal type and intensity, which influences its transmission range.

APS (120, 150) can be configured to cause the UAV to change its position relative to one or more emitters based on a respective proximity signal received from the entities. According to some examples, the APS is operably coupled to the navigation computer (124, 154) and is configured, responsive to sensing a proximity signal, to generate navigation (maneuvering) instructions and to transmit the instructions to the navigation computer, being configured in turn to provide instructions to flight control devices for causing the UAV to increase the distance from the emitter until the proximity signal complies with a first condition(s) e.g. when a measurable parameter is equal or lower than a first threshold. Once the proximity signal complies with the first condition(s), the APS is configured to generate maneuvering instructions (e.g. to navigation computer 124, 154, etc.) for causing the UAV to decrease its distance from the emitter until the proximity signal complies with a second condition(s) e.g. when a measurable parameter is equal to or higher than a second threshold.

According to one example, the APS is configured, responsive to sensing a proximity signal, to generate maneuvering instructions for causing the UAV to increase the distance from the emitter until reception of the proximity signal is lost (e.g. the first condition being zero reception of the proximity signal), and once the proximity signal is lost, the APS is configured to generate maneuvering instructions for causing the UAV to decrease its distance from the emitter until reception of the proximity signal is regained (e.g. the second condition being non-zero reception of the proximity signal).

The proximity signal indicates the boundaries of a virtual cage and enables the UAV to maintain its distance from the emitter accordingly. Thus, according to some examples disclosed herein, the APS is configured, responsive to sensing a proximity signal, to continuously monitor the signal and generate instructions causing the UAV to move closer and then away from the emitter in a continuous back and forth motion along the boundary between the UAV and the emitter as set by the proximity signal. The back and forth motion, which can be done over very short distances (the distance depends inter alia on the type of signal, e.g. 4 meters or less for Bluetooth), enables to crowd a plurality of emitters (e.g. two, three, four, etc. UAVs) in the same area.

Furthermore, according to some examples of the presently disclosed subject matter, an RF communication network, which is normally used for communication purposes, is harnessed, in this case, for crowding the vehicles in the area of interest. The data transmission capability of this type of network is used for transmitting identification data and navigation data (e.g. position, attitude, velocity) of the UAV, thus enabling to identify and follow changes in position of different UAVs in an environment densely populated with UAVs. In case more than two emitters operate in the same area of interest (e.g. three or more UAVs), each emitting a proximity signal, each UAV can identify the respective proximity signals transmitted by the different entities and maintain the distance from all other entities in the same manner.

Each UAV relies on the proximity signals transmitted by other UAVs (as well as other types of entities) operating in the same area detected in real-time and does not rely on a priori knowledge with respect to the identity or location of these UAVs. Hence, navigation of each UAV can be referred to as "blind navigation".

According to some examples of the presently disclosed subject matter, the UAV (110, 140), comprises a mechanical cage (138, 168). The mechanical cage can be made, for example, as a structure surrounding the UAV (e.g. external skeleton) and comprising a plurality of proximity sensors. The plurality of proximity sensors can be configured to provide an indication with respect to the distance between the UAV and an emitter e.g. another UAV.

According to some examples, the mechanical cage provides protective shielding for the UAV (e.g. protecting the rotors inside a cage) and enables physical contact to occur between the UAV and an emitter (e.g. another UAV) without causing damage to the UAV or disrupting its operation. Sensors attached or embedded in the cage can be configured to sense physical contact.

According to this example, the APS is configured, responsive to sensing a proximity signal indicative of contact with an emitter (e.g. another UAV), to generate maneuvering instructions (e.g. to navigation computer 124, 154) for causing the UAV to increase the distance from the emitter until the reception of the proximity signal is lost (i.e. there is no contact between the UAV and the emitter), and once the proximity signal is lost, the APS is configured to generate maneuvering instructions (e.g. to navigation computer 124, 154) for causing the UAV to decrease its distance from the emitter until reception of the proximity signal is regained (i.e. there is contact between the UAV and the emitter).

In some examples, contact sensors can be used in addition to RF sensors (Rx/Tx), where the latter are utilized for receiving information identifying different entities as well as navigation data, information that can be used by the APS for tracking the position of different mobile entities (UAVs) in its vicinity, as mentioned above.

According to various examples of the presently disclosed subject matter, when operating a plurality of UAVs over the same area, the APS (120, 150) of each UAV can be configured to maintain a horizontal distance from other UAVs while maintaining substantially the same flight altitude (e.g. within some limited tolerance dependent for example on the height of the UAV). According to this example, a plurality of UAVs flying over an area of interest are crowded in a dense formation while flying in a substantially uniform horizontal plane. This can be advantageous for example when it is desired to provide an open vertical line of sight (e.g. towards the ground) to all UAVs.

As mentioned above, this type of flying configuration can be desired when a plurality of UAVs are flying over a restricted area with the intent of capturing images (e.g. video), for example, of an ongoing event. The plurality of UAVs fly in a crowded formation in order to increase the number of UAVs that can operate in the same area and maintain substantially the same altitude, in order to avoid blocking the line of sight of one UAV by another UAV, and allowing each UAV to capture images without or with little interruption.

Likewise, in other examples, when operating a plurality of UAVs, the APS (120, 150) of each UAV can be configured to maintain a vertical distance from other UAVs while maintaining substantially the same position (e.g. within some limited tolerance). According to this example, a plurality of UAVs are flown in a single column and are crowded in a dense formation in the vertical direction.

According to some examples, an emitter can be positioned on a static structure (e.g. building, pole, water tower, silo, bridge, etc.) and is configured to transmit proximity signals in an area surrounding the structure, where the proximity signal serves to indicate an area restricted from entry of the UxV, for example, an area surrounding the structure.

Figure 2A:
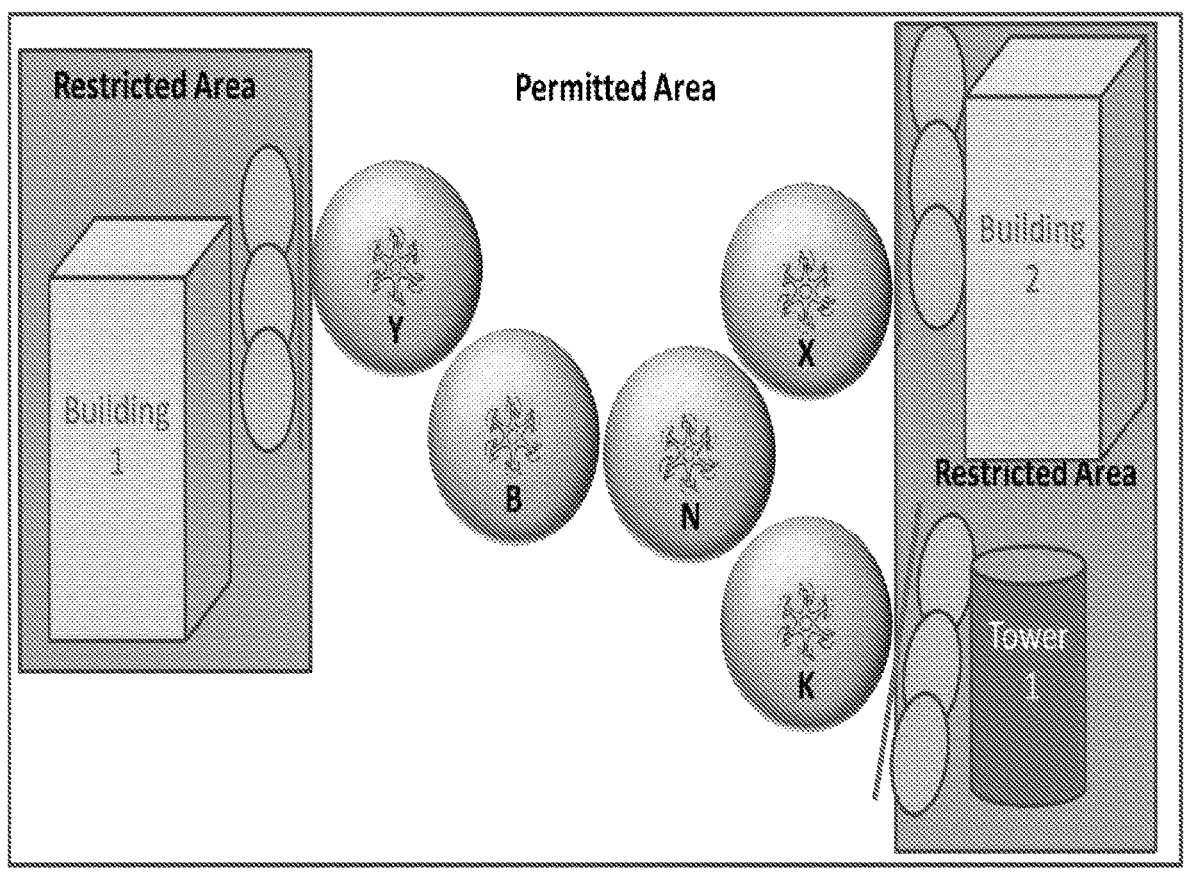
FIG. 2a is a schematic illustration of a plurality of UAVs operating in the vicinity of a restricted area, in accordance with some examples of the presently disclosed subject matter.
Figure 2B:
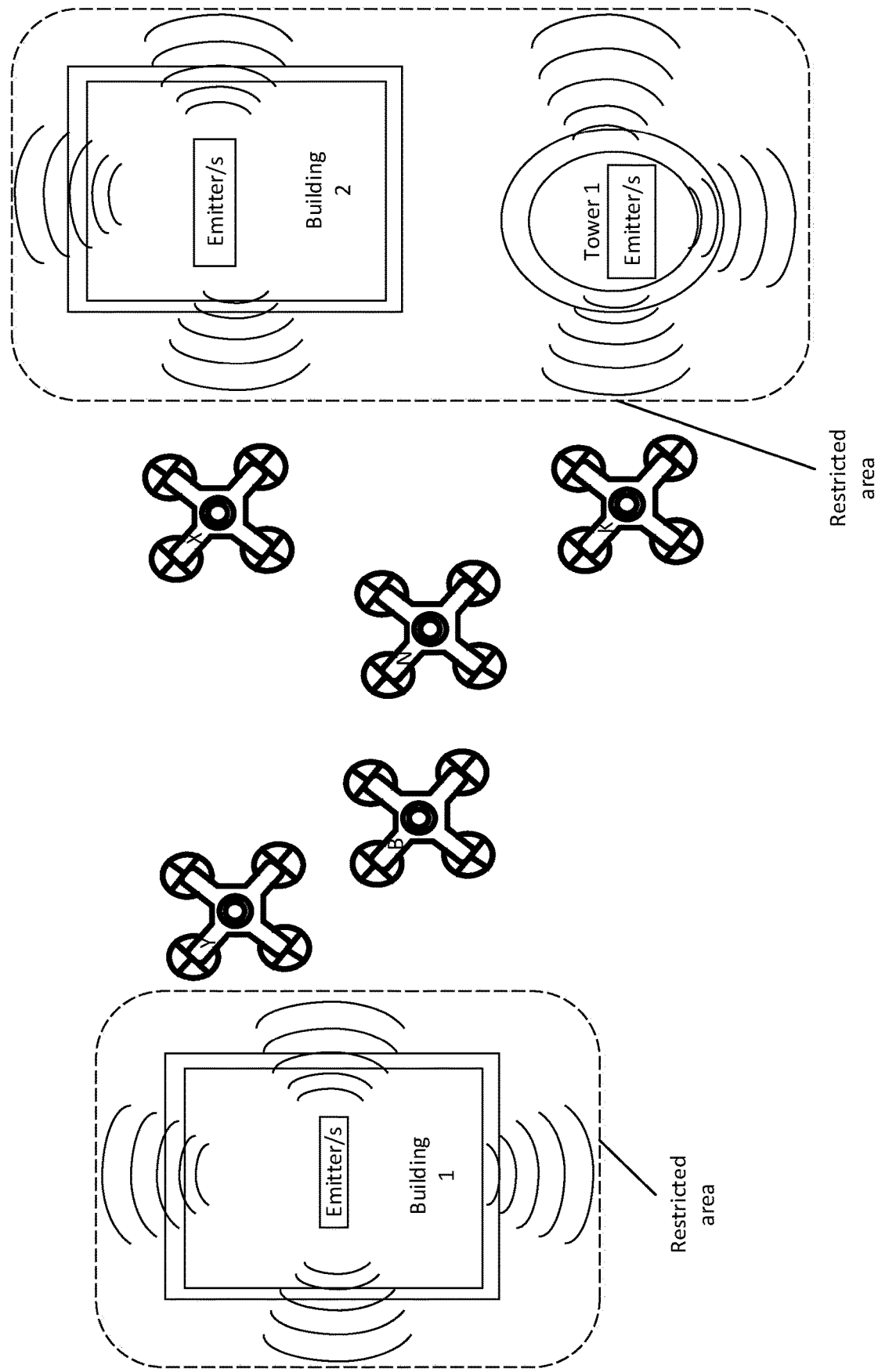

Attention is now drawn to FIGS. 2*a* and 2*b*, which present a schematic illustration of a plurality of UAVs operating in the vicinity of a restricted area, in accordance with some examples of the presently disclosed subject matter. The illustration shows a plurality of UAVs (denoted by the letters Y, X, B, N and K) flying in a densely crowded formation within an area confined by structures (building 1, building 2 and tower 1), where the structures are surrounded by a restricted area (e.g. no-flight zone). Emitters (e.g. RF transmitters) located on the structures, are configured to transmit a proximity signal indicating to the mobile units (in this example UAVs) the boundaries of the restricted area (marked by the broken lines in FIG. 2*b*). Each UAV is configured to use the proximity signal (e.g. with the help of an onboard APS) for avoiding crossing into the restricted area, e.g. avoiding collision with other UAVs and/or structures in the area. The UAV can maintain its position near the boundary indicated by the proximity signals transmitted from the emitters located on the structures by a continuous back and forth movement as described above.

According to some examples, an APS can be configured to detect more than one single, e.g. two different signals, where one signal is used for identifying the boundaries of the flight zone (effectively defining a no-flight zone) and the other is used for sensing proximity between other UAVs travelling in the flight zone. For example, one signal can be WiFi signal and the other signal (e.g. for signaling between UAVs) can be a Bluetooth signal.

According to one example, an APS which comprises both contact sensors (e.g. physical cage) and RF sensors, can be configured to use the RF sensor for sensing the proximity signals defining the no-flight zone surrounding the structures, and the contact sensors for sensing proximity (contact) with other UAVs traveling within the restricted area.

The presently disclosed subject matter also contemplates a (virtual) flight corridor where the boundaries of the corridor are defined by proximity signals of transmitters positioned along the path of the corridor. The APS on-board UAVs flying through the corridor, utilize the proximity signals to detect the virtual walls of the corridor and prevent the UAV from crossing to the area outside the corridor. More specifically, according to one example, a plurality of the emitters can be positioned each on a respective static structure located along a course or path, where the proximity signals serve to create a continuous and confined corridor assigned for the UAV to travel. Each UAV flying through the corridor can also operate as an emitter, thus enabling a plurality of UAVs to fly through the corridor in a densely packed formation without disrupting each other.

Figure 6:
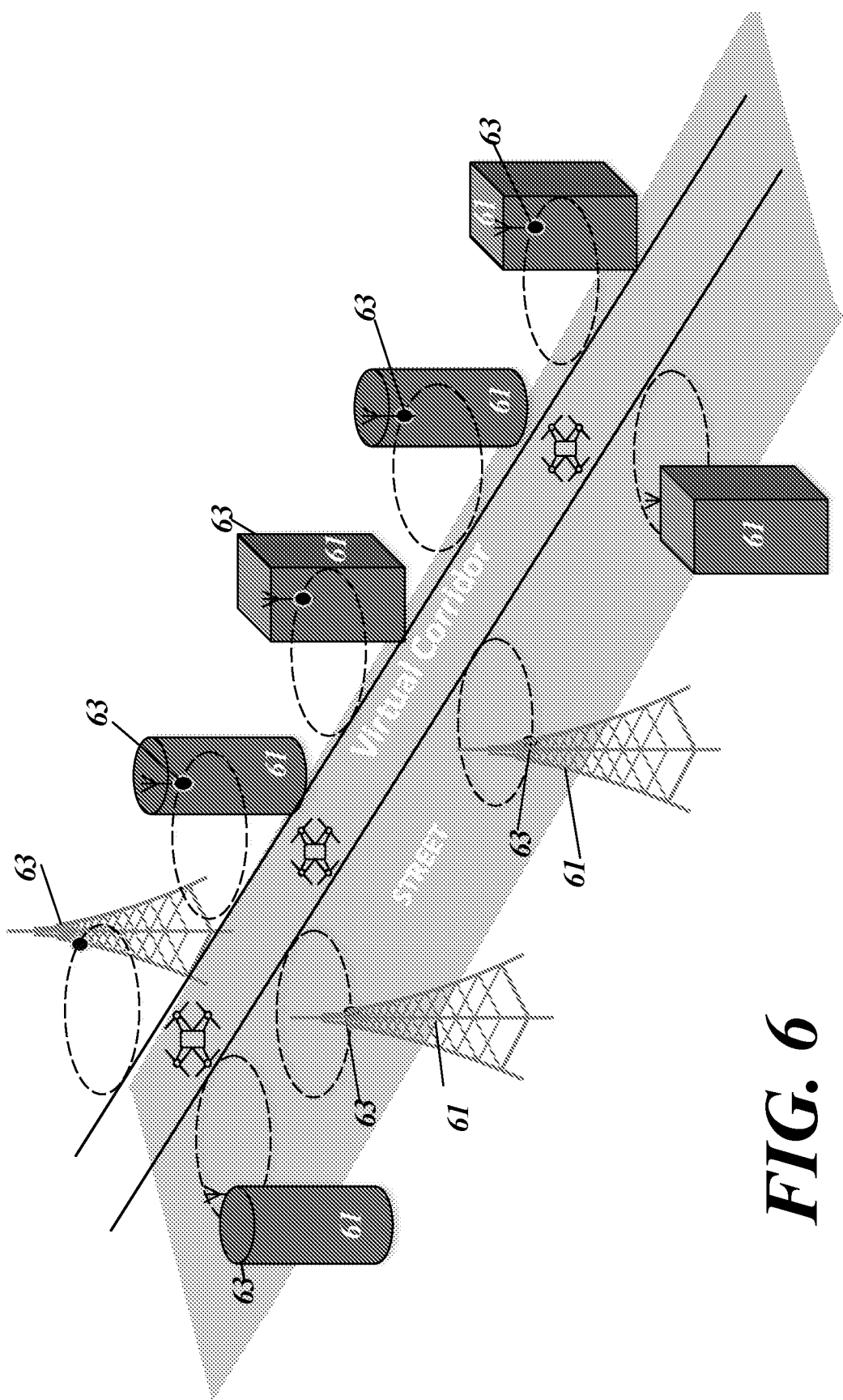
FIG. 6 is a flight corridor in accordance with some examples of the presently disclosed subject matter.

FIG. 6 is a schematic illustration of a flight corridor, in accordance with some examples of the presently disclosed subject matter. The illustration shows a path or course (e.g. along a street) having a plurality of structures 61 (e.g. buildings, light poles, bridges, silos, water towers, designated structures, etc.) located along its two sides and a plurality of proximity signal emitters 63 (e.g. RF transmitters), which are located on the structures 61. The emitters can include one or more types of emitters configured to transmit a certain proximity signal recognizable by the UAVs 65. In some examples, the proximity signals also include data identifying each emitter (e.g. transmitter and its location).

As shown in the illustration, each emitter emits a proximity signal 67 in a certain range signaling to the UAV 65 a restricted area (no-flight zone) which the UAV is not allowed to enter. The collection of no-flight zones generated by the plurality of emitters create a continues no-flight zone extending along the structures on both sides of the street, thus effectively providing a (virtual) flight corridor 69 located at the center, where the UAVs are allowed to fly. In order to obtain a continuous flight-corridor the emitters can be distributed along the course, such that the emitted proximity signals provide a continues coverage along the course. In some examples, the proximity signals transmitted by different emitters overlap or are tangent or are otherwise sufficiently close to enable the UAV to fly along the corridor without losing track. Each UAV 65 is configured to receive the proximity signal (e.g. with the help of an onboard APS) and utilize it for maintaining its position within the corridor while avoiding crossing into the restricted area located outside the corridor, closer to the structures.

As explained above with respect to FIGS. 2*a* and 2*b*, APS can be configured to detect more than one signal, e.g. two different signals, where one signal is used for identifying the boundaries (e.g. virtual walls) of the corridors and the other is used for sensing proximity between other UAVs travelling through the corridor. For example, one signal can be a WiFi signal and the other signal (e.g. for signaling between UAVs) can be a Bluetooth signal.

As further mentioned above, according to another example, an APS can comprise both contact sensors (e.g. physical cage) and RF sensors, and can be configured to use the RF sensor for sensing the proximity signals that define the boundaries (e.g. virtual walls) of the corridors and the contact sensors for sensing proximity (contact) with other UAVs traveling through the corridor. This setup allows to increase (in some cases maximize) the number of UAVs that can concurrently fly in the corridor without incurring damage which may be caused by collision.

As mentioned above, the APS can be configured to control the maneuvering of the UAV based on measurable parameters of the proximity signal. According to some examples, the measurable parameters include one or more of: a signal to noise (S/N) ratio value, a signal strength value of the received signal, or the like.

For example, when a measurable parameter is S/N ratio, a high S/N ratio value (above some predefined threshold) indicates strong reception of the proximity signal and accordingly a shorter distance from the emitter, while a low S/N ratio value (below some predefined threshold) indicates weak reception of the proximity signal, and accordingly a greater distance from the emitter. Likewise, a high power proximity signal received by the ASP indicates a shorter distance from the emitter, while a low power proximity signal received by the ASP, indicates a greater distance from the emitter.

In some examples, ASP (120, 150) can be configured to determine a distance between the UAV and the emitter based on the measurable parameter, e.g. by converting an S/N ratio value and/or power value to a corresponding distance and generating maneuvering commands for repositioning the UAV according to the calculated distance. ASP can be configured, in the event that the calculated distance is greater than a first threshold value, to generate maneuvering instructions (e.g. to navigation computer 124, 154) for causing the UAV to increase the distance from the emitter, and in the event that the calculated distance is lower than a second threshold value, to generate maneuvering instructions (e.g. to navigation computer 124, 154) for causing the UAV decrease the distance from the emitter.

The presently disclosed subject matter contemplates a system and method for generating a virtual flight corridor. The system includes a plurality of emitters positioned along a path or course for emitting proximity signals, the plurality of signals dispersed along the course defining a virtual corridor. The system may also comprise a plurality of UxVs equipped with an ASP as disclosed herein configured to detect the proximity signal and use the detected signal for maintaining course within the corridor defined by the signals.

Figure 3:
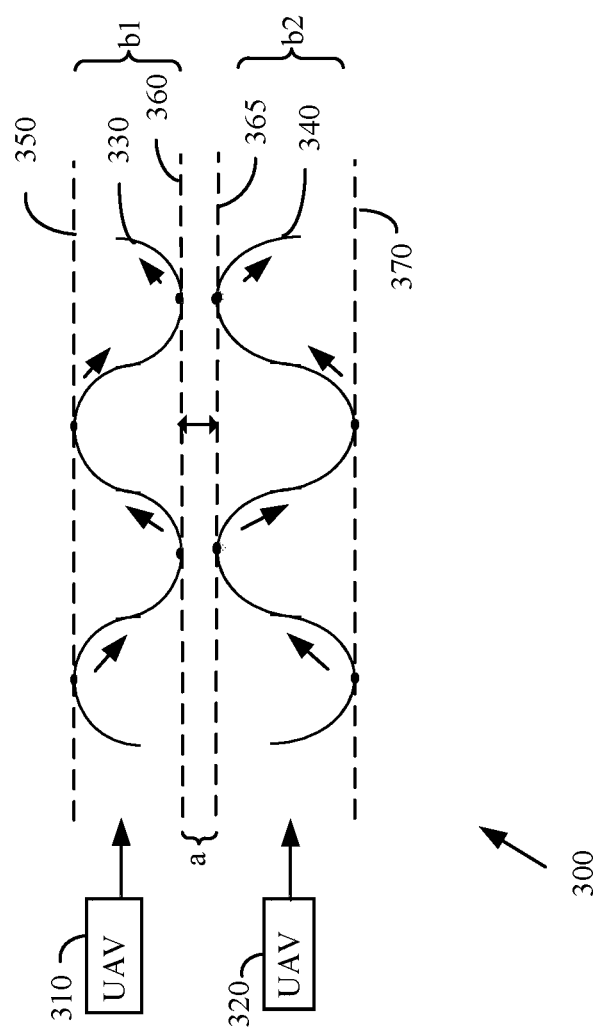
FIG. 3 is a schematic illustration, in top view, of flight maneuvers of two UAVs, in accordance with some examples of the presently disclosed subject matter.

Attention is now drawn to FIG. 3, which is a schematic illustration showing in top view, navigation maneuvers of two UAVs, in accordance with some examples of the presently disclosed subject matter. Illustration 300 shows UAV 310 and UAV 320 performing navigation towards and away from each other, as shown by lines 330 and 340, respectively, indicating flight progression of the UAVs.

For example, in response to sensing a proximity signal transmitted by UAV 320. UAV 310 flies away from UAV 320 until a measurable parameter reaches a first threshold 350. Assuming UAV 310 is also an emitter transmitting a proximity signal, UAV 320 performs a similar maneuver. As explained above, the first threshold can be, for example, loss of signal reception, loss of contact, or some other measurable signal parameter.

Once the first threshold is met (e.g. proximity signal reception is lost or its power is below a predefined value), UAV 310 flies back toward UAV 320 until the measurable parameter reaches a second threshold 360. Again, assuming UAV 310 is also an emitter transmitting a proximity signal, UAV 320 performs a similar maneuver. As explained above, the second threshold can be, for example, a point where signal reception is regained, contact between the UAVs occurs, or some other measurable signal parameter reaches a predefined value. These maneuvers can be repeated continuously during flight of the UAVs, which remain within a distance from the other UAV defined by the distances prescribed by the first and second thresholds ('b1' and/or 'b2') and the transmission range of the proximity signal ('a'). In some examples, transmission range of the proximity signal can be between 12 meters and 100 meters, depending, inter alia, on the size of the vehicle (e.g. UAV) and the type and transmission power of the transmitter.

FIG. 4 shows a more detailed schematic illustration of an APS, in accordance with some examples of the presently disclosed subject matter. APS 400 includes, for example, one or more proximity sensors, e.g., proximity sensors 410, 412 and 414. The plurality of proximity sensors may include, for example, one or more of: electromagnetic sensors, infrared sensors, ultrasonic sensor, pressure gauge for detecting contact, and/or any other sensors and/or units and/or devices and/or systems, which are capable of detecting the presence of nearby objects. As mentioned above, in some examples a proximity sensor can include a radio system (RF; e.g., Bluetooth or Wifi radio system) configured to sense a radio frequency proximity signal transmitted by an emitter.

In some examples, a proximity sensor of the plurality of proximity sensors 410, 412 and/or 414, can comprise or be otherwise operably coupled to a transmitter (Tx) 420 and a receiver (Rx) 430. Rx 430 can be configured to receive a proximity signal (e.g. signal 170 in FIG. 1), as described herein above and below. For example, Tx 420 and/or Rx 430 may be configured to operate according to IEEE 802.11 standard family, e.g., Bluetooth, WiFi, 60 GHz and/or the like. In other examples, other types of transmitters and receivers operating according to any wireless communication protocol and/or standard can be used.

APS 400 can further include one or more antennas 450 and 460 operably coupled to Rx 430 and Tx 420. The one or more antennas 450 and 460 can be configured to receive a proximity signal transmitted by an emitter. The antennas 450 and 460 can include, for example, any one of the following antenna types: omnidirectional antennas, dipoles antennas, phased array antennas, or the like.

In some examples of the presently disclosed subject matter, APS 400 includes a processing circuitry 440. Processing circuitry 440 can comprise or be otherwise operably coupled to a computer storage medium being readable by the processing circuitry storing executable instructions for performing operations as disclosed herein. Processing circuitry 440 can be operably coupled to the plurality of proximity sensors 410 and configured to receive one or more sensed signals from the plurality of proximity sensors 410. Processing circuitry 440 can be further configured to process the sensed signals and to generate steering commands for causing the UAV to change its position with respect to an emitter based on the processing output, as explained herein. In some examples, processing circuitry provides instructions to a navigation computer for causing the navigation computer to generate appropriate steering commands to be executed by flight control devices. Examples of processing logic implemented by processing circuitry 440 responsive to reception of a proximity signal are explained below with reference to FIGS. 5a-5c.

In some examples of the presently disclosed subject matter, Tx 420 comprises or is otherwise operably coupled to a processing circuitry (e.g. 440) configured to generate a proximity signal to be transmitted by Tx 420, thus UAV can operate as an emitter.

Attention is now drawn to FIG. 5a, showing a flow chart of a method 500a carried out in accordance with some with some examples of the presently disclosed subject matter. In general, operations disclosed in FIG. 5a (as well as 5b and 5c) can be executed by a UxV (including for example ASP) as described above. However, reference made to elements in the figures above is done by way of example only and should not be construed as limiting. It is noted that alternative system designs preserving the same functional principles are likewise contemplated.

A UAV is deployed over an area of interest possibly crowded with a plurality of other UAVs (block 510). According to some examples, each UAV (or at least part thereof) operating in the area of interest is configured to detect the proximity of other UAVs operating in the same area. To this end each UAV can comprise an ASP configured to sense and process proximity signals. Part or all of the UAVs operating in the area of interest also operate as emitters capable of transmitting proximity signals.

The UAV senses the presence of an emitter e.g. another UAV (block 520). According to one example, sensing the presence of an emitter includes sensing a respective proximity signal transmitted by one or more respective emitters. More specifically, the proximity signal can be an RF signal (e.g. Bluetooth or Wifi), as explained above.

According to some examples, in response to sensing the proximity signal, the UAV is configured (e.g. by the on-board ASP) to generate instructions causing the UAV to increase the distance from the emitter (block 530). Once reception of the proximity signal is lost, as a result of the UAV maneuver, the UAV (e.g. by the on-board ASP) is configured to generate instructions, causing the UAV to decrease the distance from the emitter until reception of the proximity signal is regained (block 540).

As explained above, according to various examples of the presently disclosed subject matter, the ability of a data carrying signal, such as an RF signal, is harnessed for improving the operation of the ASP on-board the UAV, and maintaining accurate relative position between the UAV and one or more emitters. As mentioned above, the RF signal can include for example data identifying the emitter, as well as data indicative of the location of the emitter and/or its altitude, direction and speed. This information can be used to uniquely identify different emitters all operating in the same area. The transmitted data can also be used to keep track of changes in the relative position of a mobile emitter and accordingly to enable to accurately retract to its current position. For example, information pertaining to direction, speed and attitude obtained from a proximity signal emitted by a first UAV can be used by the ASP of a second UAV in order to calculate the current and/or future position of the first UAV to enable to fly toward the first UAV, which may change its position (e.g. for independently reacting to received proximity signals, and changing its position accordingly). Operations described with reference to blocks 520 to 540 are repeated to thereby cause the UAV to maintain its position along a boundary defined by the emitted proximity signal.

FIG. 5b shows another example of a method 500b, where sensing includes detection of physical contact with the emitter, e.g. by utilizing a mechanical cage protecting the UAV and enabling contact with other UAVs or some other emitter. As mentioned above, in some examples, the method also includes receiving proximity signals transmitted by emitters in order to obtain information, including data identifying different entities and their respective navigation data. Notably, maneuvering the UAV based on physical contact can be done in addition to receiving a proximity signal. For example, proximity between UAVs can be defined based on contact, while identification of different UAVs, and determination of their current or future location, is determined based on information obtained from the proximity signal (including navigation data).

FIG. 5c shows yet another example of a method 500c carried out in accordance with some examples of the presently disclosed subject matter. Similar to the previous examples, a UAV is deployed over a restricted area of interest possibly crowded with a plurality of other UAVs (block 510c). A UAV is configured to sense the proximity signal transmitted by emitters (e.g. other UAVs). To this end each UAV can comprise an ASP as described above. In some examples the signal is an RF signal of some sort, comprising information identifying the emitter and/or information indicating navigation data of the emitter.

At block 530c, the UAV determines (e.g. with the help of an APS processing unit 440) whether the sensed signal complies with one or more predefined conditions. As explained above, a condition can be some measurable signal parameter (e.g. signal power. S/N ratio) which can be indicative of the distance between the UAV and the emitter. In some examples, processing unit 440 can be configured to convert the measured signal parameter into a respective range value between the UAV and the emitter. In other examples, determination is made based on the measured parameter value itself.

If the measurable parameter of the sensed proximity signal complies with a condition indicative of a distance that is shorter than a certain predefined threshold (e.g. signal power above a certain value) value, the UAV is configured (e.g. by on-board APS) to generate instructions for causing the UAV to increase the distance from the emitter (block 540c).

If the measurable parameter of the sensed proximity signal complies with a condition indicative of a distance that is greater than a certain predefined threshold (e.g. signal power below a certain value) value, the UAV is configured (e.g. by on-board APS) to generate instructions causing the UAV to decrease the distance from the emitter (block 550c).

It is noted that while FIGS. 5a-5a are described as separate examples, operations described in the different figures can be combined and implemented together, and, accordingly, a combination of the methods should be considered within the scope of this disclosure. For example, as shown in the description above and claims below according to the presently disclosed subject matter, a UAV can use both a data-carrying proximity signal (described in FIG. 5a) and contact based proximity detection (described in FIG. 5b).

It will also be understood that the system according to the presently disclosed subject matter may be a suitably programmed computer. Likewise, the presently disclosed subject matter contemplates a computer program being readable by a computer (e.g. processing circuitry 440) for executing various methods according to the presently disclosed subject matter. The presently disclosed subject matter further contemplates a computer-readable non-transitory memory tangibly embodying a program of instructions executable by the computer (e.g. processing circuitry 440) for performing various methods according to the presently disclosed subject matter. The term "non-transitory" is used herein to exclude transitory, propagating signals, but to otherwise include any volatile or non-volatile computer memory technology suitable to the application.

It is to be understood that the presently disclosed subject matter is not limited in its application to the details set forth in the description contained herein or illustrated in the drawings. The presently disclosed subject matter is capable of other embodiments and of being practiced and carried out in various ways. For example, although the description above predominantly pertains to UAVs, this is done by way of non-limiting example for the sake of simplicity only. The presently disclosed subject matter is not limited to UAVs only, and according to some examples the teaching disclosed herein with respect to UAVs can be likewise be implemented for controlling other units such as Unmanned Ground Vehicles, and Unmanned Marine Vehicles.

Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

The invention claimed is:

1. An active proximity system (APS) mountable on an unmanned autonomous vehicle (UxV), configured to cause the UxV to maintain a range from one or more emitters operating in an area, the APS comprising:

one or more proximity sensors and a processing circuitry operably coupled to the one or more proximity sensors;

the one or more proximity sensors are configured to sense one or more proximity signals arriving from multiple directions, each of the one or more proximity signals is indicative of presence of a respective emitter in proximity to the UxV within the area thereby providing a virtual spherical cage surrounding the UxV; the processing circuitry is configured, responsive to a sensed proximity signal, to repeatedly:

cause the UxV to move toward and then away a boundary between the UxV and the emitter as set by the sensed proximity signal, wherein:

upon determining that at least one measurable parameter of the sensed proximity signal complies with a first condition, generate maneuvering instructions dedicated for causing the UxV to move and increase a distance between the UxV and the respective emitter; and then upon determining that at least one measurable parameter of the proximity signal complies with a second condition, generate maneuvering instructions dedicated for causing the UxV to move and decrease the distance between the UxV and the respective emitter;

and thereby maintain the UxV within a certain range from the respective emitter defined by the sensed proximity signal and the first and second conditions and increase the number of UxVs that can operate concurrently in the area;

a mechanical cage configured to protect the UxV from mechanical damage; the mechanical cage comprises and/or is otherwise operatively connected to one or more proximity sensors capable of sensing physical contact therewith, and wherein the processing circuitry is configured, responsive to physical contact sensed by the cage, to:

generate maneuvering instructions dedicated for causing the UxV to move and increase the distance between the UxV and the respective emitter until there is no physical contact between the UxV and the emitter, and then generate maneuvering instructions dedicated for causing the UxV to move and decrease the distance between the UxV and the respective emitter until there is physical contact between the UxV and the emitter.

2. The system of claim 1, wherein the sensed proximity signal is transmitted by a respective emitter and wherein the first condition is non-zero reception of the proximity signal and the second condition is zero reception of the proximity signal.

3. The system of claim 1, wherein the sensed proximity signal is transmitted by the respective emitter and wherein the first condition is that a value of the measurable parameter of the proximity signal is indicative of a distance between the UxV and the emitter, which is equal to or greater than a predefined threshold, and wherein the second condition is that the value of the measurable parameter of the proximity signal is indicative of a distance between the UxV and the emitter, which is smaller than the predefined threshold.

4. The system of claim 1, wherein the sensed proximity signal is transmitted by the emitter and wherein the one or more proximity sensors include a receiver configured to receive a data-carrying proximity signal comprising data identifying the emitter and/or navigation data.

5. The system of claim 4, wherein the receiver is an RF receiver configured to receive an RF proximity signal.

6. The system of claim 5, wherein the receiver includes a Wifi and/or Bluetooth receiver, configured to receive a Wifi proximity signal and/or Bluetooth proximity signal, respectively.

7. The system of claim 4, wherein the processing circuitry is configured to obtain the data from the sensed proximity signal and determine, based on the data, a current and/or future position of the emitter.

8. The system of claim 1, wherein the processing circuitry is configured to provide the maneuvering instructions to a navigation computer on-board the UxV, configured to control a driving unit on-board the UxV, configured for moving the UxV.

9. The system of claim 1, wherein the one or more emitters include at least one UAV.

10. The system of claim 1, wherein the UxV is a UAV.

11. A method of deploying a UxV in an area populated with a plurality of emitters, the method comprising executing at the UxV the following operations:

sensing, by one or more proximity sensors, one or more proximity signals, each of the one or more proximity signals arriving from a different direction and being indicative of a presence of a respective emitter in proximity to the UxV within the area, thereby providing a virtual spherical cage surrounding the UxV;

processing a sensed proximity signal, and repeatedly:

moving towards and then away a boundary between the UxV and the emitter as set by the sensed proximity signal, wherein, upon determining that at least one measurable parameter of the proximity signal complies with a first condition, generating maneuvering instructions dedicated for causing the UxV to move and increase a distance between the UxV and the respective emitter; and then upon determining that at least one measurable parameter of the proximity signal complies with a second condition, generating maneuvering instructions dedicated for causing the UxV to move and decrease the distance between the UxV and the respective emitter;

and thereby maintaining the UxV within a certain range from the respective emitter defined by the sensed proximity signal and increasing the number of UxVs that can operate concurrently in the area;

sensing by one or more one or more proximity sensors capable of sensing physical contact with a mechanical cage configured to protect the UxV from mechanical damage; the method further comprising responsive to physical contact sensed by the cage;

generating maneuvering instructions dedicated for causing the UxV to move and increase the distance between the UxV and the respective emitter until there is no physical contact between the UxV and the emitter, and then generating maneuvering instructions dedicated for causing the UxV to move and decrease the distance between the UxV and the respective emitter until there is physical contact between the UxV and the emitter.

12. The method of claim 11, wherein the sensed proximity signal is transmitted by a respective emitter and wherein the first condition is non-zero reception of the proximity signal, causing the UxV to move and increase the distance between the UxV and the respective emitter, and the second condition is zero reception of the proximity signal, causing the UxV to move and decrease the distance between the UxV and the respective emitter.

13. The method of claim 11, wherein the sensed proximity signal is transmitted by a respective emitter, and wherein the first condition is that a value of the measurable parameter of the proximity signal is indicative of a distance between the UxV and the emitter, which is equal to or greater than a predefined threshold, and wherein the second condition is that the value of the measurable parameter of the proximity signal is indicative of a distance between the UxV and the emitter, which is smaller than the predefined threshold.

14. The method of claim 11, wherein the sensed proximity signal is a data-carrying proximity signal comprising data identifying the emitter and/or navigation data.

15. The method of claim 10, wherein the sensed proximity signal is an RF signal including any one of a Wifi proximity signal and/or Bluetooth proximity signal.

16. The method of claim 14, further comprising: obtaining the data from the sensed proximity signal and determining, based on the data, a current and/or future position of the emitter.

17. The method of claim 10, wherein the one or more emitters include at least one UxV.

18. A UxV configured to be deployed in an area populated by a plurality of emitters, the UxV comprising:
a driving unit configured to drive the UxV; an active proximity system (APS), configured to cause the UxV to maintain a range from one or more emitters, the APS comprising:
one or more proximity sensors and a processing circuitry operably coupled to the one or more proximity sensors;
the one or more proximity sensors is configured to sense one or more proximity signals arriving from different directions, each of the one or more proximity signals is indicative of a presence of a respective emitter in proximity to the UxV within the area and thereby provide a virtual spherical cage surrounding the UxV;
the processing circuitry is configured, responsive to a sensed proximity signal, to repeatedly:
cause the UxV to move toward and then away a boundary between the UxV and the emitter as set by the sensed proximity signal, wherein, upon determining that at least one measurable parameter of the proximity signal complies with a first condition, generate maneuvering instructions dedicated for causing the driving unit to move the UxV and increase a distance between the UxV and the respective emitter; and then
upon determining that at least one measurable parameter of the proximity signal complies with a second condition, generate maneuvering instructions dedicated for causing the driving unit to move the UxV and decrease the distance between the UxV and the respective emitter;
to thereby maintain the UxV within a certain range from the respective emitter defined by the sensed proximity signal
a mechanical cage configured to protect the UxV from mechanical damage; the mechanical cage comprises and/or is otherwise operatively connected to one or more proximity sensors capable of sensing physical contact therewith, and wherein the processing circuitry is configured, responsive to physical contact sensed by the cage, to:
generate maneuvering instructions dedicated for causing the UxV to move and increase the distance between the UxV and the respective emitter until there is no physical contact between the UxV and the emitter, and then generate maneuvering instructions dedicated for causing the UxV to move and decrease the distance between the UxV and the respective emitter until there is physical contact between the UxV and the emitter.

19. A system for restricting movement of UxVs within a virtual corridor, the system comprising:
a plurality of stationary emitters positioned at a plurality of respective locations along a course; wherein each stationary emitter is configured to transmit a proximity signal indicating an area restricted for entry of the UxVs;
transmitting from each stationary emitter a proximity signal indicating an area restricted from entry of the UxV; wherein the stationary emitters are distributed along the course in a manner that creates a continuous coverage of proximity signals along the course to thereby provide the virtual corridor where the UxV are allowed to travel;
at least one UxV comprising:
a driving unit configured to drive the UxV; an active proximity system (APS), configured to cause the UxV to maintain a range from one or more emitters, the APS comprising:
one or more proximity sensors and a processing circuitry operably coupled to the one or more proximity sensors;
the one or more proximity sensors are configured to sense a plurality of proximity signals, each of the one or more proximity signals arriving from a different directions—is indicative of a presence of a respective emitter in proximity to the UxV and thereby provide a virtual spherical cage surrounding the UxV, wherein the respective emitter is any one of; a stationary emitter or another UxVs travelling in the corridor;
the processing circuitry is configured, responsive to a sensed proximity signal, to repeatedly:
cause the UxV to move toward and then away a boundary between the UxV and the emitter as set by the sensed proximity signal, wherein:
upon determining that at least one measurable parameter of the proximity signal complies with a first condition, generate maneuvering instructions dedicated for causing the driving unit to move the UxV and increase a distance between the UxV and the respective emitter; and then
upon determining that at least one measurable parameter of the proximity signal complies with a second condition, generate maneuvering instructions dedicated for causing the driving unit to move the UxV and decrease the distance between the UxV and the respective emitter;
to thereby maintain the UxV within a certain range from the respective emitter defined by the sensed proximity signal and increasing the number of UxVs that can move through the corridor at the same time
the UxV further comprising a mechanical cage configured to protect the UxV from mechanical damage; the mechanical cage comprises and/or is otherwise operatively connected to one or more proximity sensors capable of sensing physical contact therewith, and wherein the processing circuitry is configured, responsive to physical contact sensed by the cage, to:
generate maneuvering instructions dedicated for causing the UxV to move and increase the distance between the UxV and the respective emitter until there is no physical contact between the UxV and the emitter, and then generate maneuvering instructions dedicated for causing the UxV to move and decrease the distance between the UxV and the respective emitter until there is physical contact between the UxV and the emitter.

* * * * *